United States Patent
Bhattacharja et al.

(10) Patent No.: US 10,584,049 B2
(45) Date of Patent: Mar. 10, 2020

(54) SCALE CONTROL IN PHOSPHORIC ACID PRODUCTION AND HANDLING PLANTS

(71) Applicant: Ecolab USA Inc., St. Paul, MN (US)

(72) Inventors: Sankar Bhattacharja, Naperville, IL (US); Jasbir Gill, Naperville, IL (US); Yuhuan Jin, Shanghai (CN); Paul Wiatr, Roselle, IL (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/957,339

(22) Filed: Apr. 19, 2018

(65) Prior Publication Data

US 2018/0305234 A1 Oct. 25, 2018

(30) Foreign Application Priority Data

Apr. 20, 2017 (CN) .......................... 2017 1 0264732

(51) Int. Cl.
*C02F 5/10* (2006.01)
*C02F 1/04* (2006.01)
(Continued)

(52) U.S. Cl.
CPC .............. *C02F 5/10* (2013.01); *C01B 25/222* (2013.01); *C01B 25/2346* (2013.01);
(Continued)

(58) Field of Classification Search
CPC .... C02F 1/06; C02F 1/042; C02F 5/10; C02F 5/14; C23F 14/02; C01B 25/222; C01B 25/2346; C01B 25/32
See application file for complete search history.

(56) References Cited

U.S. PATENT DOCUMENTS 4,196,172 A * 4/1980 Ore ........................ B01J 19/002
                                                  423/157.4
5,338,477 A * 8/1994 Chen ........................ C02F 5/14
                                                  210/700
(Continued)

FOREIGN PATENT DOCUMENTS

CN        1762857 A     4/2006
EP        0516382 A1    12/1992
EP        0711733 A1    5/1996

OTHER PUBLICATIONS

Gilmour, R.B. (2019) "Phosphoric Acids and Phosphates," Kirk-Othmer Encyclopedia of Chemical Technology, Wiley, 51 pgs [Office action cites pp. 11 and 13].*

(Continued)

*Primary Examiner* — Brian A McCaig
(74) *Attorney, Agent, or Firm* — Kagan Binder, PLLC

(57) ABSTRACT

Disclosed herein are compositions and methods of mitigating scale in phosphoric acid and ammonium phosphate plants. Scale-mitigating compositions of the invention can be added to phosphoric acid before or during the concentration in the evaporator cycle of a phosphoric acid plant. The compositions retard the formation of scale on surfaces in contact with the phosphoric acid, and thus time between cleaning is extended and plant productivity increased. Further, the scale that forms is softer and more easily cleaned from surfaces, reducing non-operation time of the plant and/or evaporator. Methods of mitigating scale formation in phosphoric acid production and phosphoric acid handling plants are disclosed. In the methods, scales accumulate more slowly and are softer, more tractable, and more easily cleaned from surfaces to which they adhere.

9 Claims, 6 Drawing Sheets

(51) Int. Cl.
*C02F 1/06* (2006.01)
*C01B 25/234* (2006.01)
*C02F 5/14* (2006.01)
*C01B 25/222* (2006.01)
*C01B 25/32* (2006.01)
*C23F 14/02* (2006.01)
*C02F 101/10* (2006.01)

(52) U.S. Cl.
CPC .............. *C01B 25/32* (2013.01); *C02F 1/042* (2013.01); *C02F 1/06* (2013.01); *C02F 5/14* (2013.01); *C23F 14/02* (2013.01); *C02F 2101/101* (2013.01); *C02F 2303/22* (2013.01)

(56) References Cited

U.S. PATENT DOCUMENTS

| | | |
|---|---|---|
| 6,162,391 A | 12/2000 | Kowata et al. |
| 9,221,700 B2 | 12/2015 | Greene et al. |
| 2012/0161068 A1* | 6/2012 | Greene ............... C02F 5/10 |
| | | 252/181 |
| 2012/0244058 A1 | 9/2012 | Ravishankar et al. |
| 2016/0017200 A1* | 1/2016 | Yang .................. C09K 5/20 |
| | | 422/7 |

OTHER PUBLICATIONS

Behbahani et al., "Heat Exchanger Fouling in Phosphoric Acid Evaporators—Evaluation of Field Data", Heat Exchanger Fouling and Cleaning: Fundamentals and Applications, Art. 9, Engineering Conferences International, 2003, 9 pages.
A Guide to Sealing Phosphoric Acid Plants, Aesseal Environmental Technology, 2002, 24 pages.
International Search Report for Application No. PCT/US2018/028320, dated Jul. 23, 2018, 6 pages.
Written Opinion for Application No. PCT/US2018/028320, dated Jul. 23, 2018, 13 pages.

* cited by examiner

2000 μm

SCALE CONTROL IN PHOSPHORIC ACID PRODUCTION AND HANDLING PLANTS

TECHNICAL FIELD

The present disclosure relates to compositions and methods of mitigating scale in phosphoric acid and ammonium phosphate plants.

BACKGROUND OF THE INVENTION

The formation of scale in phosphoric acid plants and plants handling phosphoric acid has been a major problem in the phosphoric acid industry for decades. The reaction of phosphate ores such as a fluorapatite $Ca_{10}(PO_4)_6(F,OH)_2$ and/or a francolite $Ca_{10}(PO_4)_{6-x}(CO_3)_x(F,OH)_{2+x}$ with sulfuric acid produces the desired phosphoric acid along with suspended and/or dissolved solids. Phosphoric acid concentration is normally expressed as percent by weight of $P_2O_5$.

The basic equation for the reaction for production of phosphoric acid from sulfuric acid and calcium ions and phosphate ions from ores can be written:

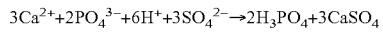

$$3Ca^{2+}+2PO_4^{3-}+6H^++3SO_4^{2-} \rightarrow 2H_3PO_4+3CaSO_4$$

The reaction between sulfuric acid and phosphate ore is normally carried out in an attack tank at elevated temperatures. After reaction, the phosphoric acid normally contains dissolved and suspended solids—the majority of the latter are filtered off. The filtered acid is then passed to an evaporator, where it is concentrated. The acid is heated by passing it through a heat exchanger heated by pressurized steam; the phosphoric acid is subsequently concentrated under reduced pressure in a vapor or flash chamber in the evaporator, where water evaporates from the phosphoric acid so that the acid is concentrated. Further suspended solids and/or dissolved solids in the phosphoric acid precipitate during the concentration process and deposit as scale on the surface of the heat exchanger and/or chamber surfaces. Typically such scale comprises polymorphs of calcium sulfate and several other minerals. Over time, the scale that accumulates on the surface of the heat exchanger reduces the efficiency thereof. Production needs to be stopped and the evaporator shut down for cleaning, an interruption that results in lost production time and increased production costs. Further, the scale that forms is extremely hard and adheres tenaciously to the surfaces on which it has deposited, and is thus intractable and difficult to clean from the surfaces. Further, the scale that deposits and accumulates is of relatively low water-solubility. Cleaning thus involves a considerable mechanical effort (hydroblasting), resources such as energy, water and materials, and manpower. One type of cleaning involves boil-out with dilute sulfuric acid. Furthermore, hard scale accumulated on heat exchanger surfaces is implicated in the breakage of fragile impregnated graphite tubes, which the heat exchanger may comprise.

Chemicals such as scale-inhibitors can be added to the phosphoric acid to mitigate scale build-up, but do not completely prevent the formation of scale that deposits on various surfaces. Therefore there is a need for new processes and materials that prevent, reduce, and/or slow formation and/or accumulation of scale on surfaces in contact with phosphoric acid in phosphoric acid plants or phosphoric acid sourced therefrom. There is a need to ameliorate the effects of scale accumulated on and adhering to heat exchanger and other surfaces of evaporators, pipes and the like that are or have been in contact with phosphoric acid made from the reaction of phosphate ores and sulfuric acid.

SUMMARY OF THE DISCLOSURE

Disclosed herein is a method comprising adding an aqueous scale-mitigating composition to a first phosphatic composition to form a second phosphatic composition; and contacting a scale-accumulating surface with the second phosphatic composition. The aqueous scale-mitigating composition comprises water, a polyamino polyether methylene tetraphosphonate, a copolymer of acrylic acid and 2-acrylamido-2-methylpropane sulfonic acid, and a further component selected from the group consisting of (i) poly(methacrylic acid), (ii) a tetrapolymer of acrylic acid, 2-acrylamido-2-methylpropane sulfonic acid, (N-t-butyl) acrylamide, and itaconic acid, (iii) a copolymer of acrylic acid and a hydroxypolyethoxy allyl ether, and (iv) any combination thereof.

In embodiments, the method further comprises combining a phosphate ore and sulfuric acid to form a phosphate reaction mixture, maintaining the phosphate reaction mixture at 65° C. to 120° C. for 30 minutes to five hours to form a crude phosphoric acid; and filtering the crude phosphoric acid to provide the first phosphatic composition.

Also disclosed herein is a method wherein a nozzle comprises the scale-accumulating surface, the scale-accumulating surface defines an orifice therein, and the method consists of spraying the second phosphatic composition from the orifice into a chamber. In embodiments, the chamber contains liquid ammonia.

Also disclosed herein is a method comprising disposing the second phosphatic composition in an evaporator of a phosphoric acid production plant, the evaporator comprising a fluid containment, the fluid containment comprising one or more of a flash chamber, a heat exchanger, an outflow pipe, and an inflow pipe, wherein the fluid containment comprises the scale-accumulating surface; and heating the second phosphatic composition, wherein a second scale accumulates on the scale-accumulating surface.

Disclosed herein is a scale-mitigating composition comprising a polyamino polyether methylene tetraphosphonate, a copolymer of acrylic acid and 2-acrylamido-2-methylpropane sulfonic acid, and a further component selected from the group consisting of (i) poly(methacrylic acid), (ii) a tetrapolymer of acrylic acid, 2-acrylamido-2-methylpropane sulfonic acid, (N-t-butyl)acrylamide, and itaconic acid, (iii) a copolymer of acrylic acid and hydroxypolyethoxy allyl ether, and (iv) any combination of (i), (ii), and (iii). Also disclosed herein is an aqueous scale-mitigating composition comprising the scale-mitigating composition and further comprising water.

Also disclosed herein is an evaporator assemblage comprising an evaporator and any of the second phosphatic compositions described herein, the evaporator comprising a flash chamber and one or more of a heat exchanger, an outflow pipe, and an inflow pipe, wherein the flash chamber and the one or more of the heat exchanger, the outflow pipe, and the inflow pipe are in fluid communication with each other and together define a circulation route that includes a scale-accumulating surface, wherein the second phosphatic composition is disposed within the circulation route and contacts the scale-accumulating surface. In embodiments, a second scale adheres to the scale-accumulating surface, the second scale comprising calcium sulfate. In embodiments, the second scale comprises potassium aluminum hydrogen phosphate. In embodiments, the second scale is substantially free of magnesium pentafluoroaluminate.

DETAILED DESCRIPTION

Definitions

Figure 1:
FIG. 1 shows a picture of washed and dried scale from heat exchanger according to Pretrial B in Example 1.

The following definitions are provided to determine how terms used in this application, and in particular how the claims, are to be construed. The organization of the definitions is for convenience only and is not intended to limit any of the definitions to any particular category.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)", "include(s)", "having", "has", "can", "contain(s)", and variants thereof, as used herein, are intended to be open-ended transitional phrases, terms, or words that do not preclude the possibility of additional acts or structures. The singular forms "a", "and", and "the" include plural references unless the context clearly dictates otherwise. The present disclosure also contemplates other embodiments "comprising", "consisting of" and "consisting essentially of", the embodiments or elements presented herein, whether explicitly set forth or not.

As used herein, the term "optional" or "optionally" means that the subsequently described component, event or circumstance may but need not be present or occur. The description therefore discloses and includes instances in which the event or circumstance occurs and instances in which it does not, or instances in which the described component is present and instances in which it is not.

As used herein, the term "about" modifying, for example, the quantity of an ingredient in a composition, concentration, volume, temperature, time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, through standard operating machine error, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents according to this definition.

As used herein, the term "substantially" means "consisting essentially of", as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination or incomplete purification. A "minor amount" may be a trace, an unmeasurable amount, an amount that does not interfere with a value or property, or some other amount as provided in context. A composition that has "substantially only" attached to a provided list of components may consist of only those components, or have a trace amount of some other component present, or have one or more additional components that do not materially affect the properties of the composition. Except where otherwise defined herein, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

As used herein, "ppm" means parts per million by weight. Except where otherwise noted, all concentrations recited herein are based on weight.

"Consisting essentially of" means that the methods and compositions may include additional steps, components, ingredients or the like, but only if the additional steps, components and/or ingredients do not materially alter the basic and novel characteristics of the claimed methods and compositions.

As used herein "phosphoric acid" means orthophosphoric acid, $H_3PO_4$.

As used herein, "phosphate" means orthophosphate, $PO_4^{3-}$.

As used herein, "dihydrogenphosphate" means the $H_2PO_4^-$ ion.

As used herein, unless otherwise specified, "hexafluorosilicate" means a compound comprising one or more cations and hexafluorosilicate ($SiF_6^{2-}$), or hexafluorosilicic acid ($H_2SiF_6$). Non-limiting examples of hexafluorosilicates include sodium hexafluorosilicate, $Na_2SiF_6$, potassium sodium hexafluorosilicate, $KNaSiF_6$; magnesium hexafluorosilicate, $MgSiF_6$, and hexafluorosilicic acid, $H_2SiF_6$.

As used herein, "potassium aluminum hydrogen phosphate" means $KAl_3H_{14}(PO_4)_8 \cdot xH_2O$, wherein x is an integer from 0 to 10 inclusive. The term "potassium aluminum hydrogen phosphate" therefore includes a compound having the approximate empirical formula $Al_3KH_{14}(PO_4)_8 \cdot 4H_2O$.

Unless otherwise specified, the chemical names for ionic compounds or metal salts shall be construed to include compounds having any amount of water of crystallization content: for example "magnesium hexafluorosilicate" may refer herein to the compound having the formula $MgSiF_6 \cdot 6H_2O$; "magnesium pentafluoroaluminate" may refer herein to $MgAlF_5 \cdot 1.5H_2O$; calcium sulfate may refer herein to anhydrite ($CaSO_4 \cdot 2H_2O$), hemihydrate ($CaSO_4 \cdot 0.5H_2O$), gypsum ($CaSO_4 \cdot 2H_2O$), or any combination thereof.

As used herein, the term "phosphate reaction mixture" means a mixture produced by the combination of a phosphate ore and sulfuric acid.

As used herein, "crude phosphoric acid" means a phosphate reaction mixture comprising phosphoric acid. In embodiments, the reaction between the phosphate ions and the sulfuric acid is substantially complete.

As used herein, the term "reduced pressure" means a pressure of less than one atmosphere. Herein, "applying a reduced pressure" means reducing the pressure of a headspace to less than one atmosphere, headspace being over a liquid mixture; and/or reducing the pressure of the interior of a containment containing the liquid mixture.

As used herein, "liquid mixture" means a mixture of a liquid with one or more other liquids, or a mixture of at least one liquid with one or more solids.

As used herein, "phosphate ore" means an ore comprising $PO_4^{3-}$, $HPO_4^{2-}$, and/or $H_2PO_4^-$. In embodiments, the ore comprises $Ca^{2+}$. Non-limiting examples of phosphate ores include apatites, fluorapatite, francolite, and any other ores comprising phosphate ions. In embodiments, the apatite has or comprises a material having the general formula $(Ca, Na, Mg)_{10}(PO_4)_{6-x}(CO_3)_x F_y (F,OH)_{2+y}$, wherein x is an integer from 1 to 5 and y=0.33x to 0.5x.

As used herein, "phosphatic composition" means a mixture comprising $PO_4^{3-}$, $HPO_4^{2-}$, $H_2PO_4^-$, and/or $H_3PO_4$. In embodiments, the phosphatic composition is a first phosphatic composition or a second phosphatic composition.

As used herein, "first phosphatic composition" means a composition comprising phosphoric acid and calcium sulfate. In embodiments, the first phosphatic composition is a crude phosphoric acid that has been filtered to remove insoluble material.

As used herein, "second phosphatic composition" means a composition comprising a first phosphatic composition and further comprising one of the scale-mitigating compositions disclosed herein.

As used herein "scale-mitigating composition" means a composition that mitigates scale produced by evaporation of one or more volatiles from a phosphatic composition while the phosphatic composition is in contact with one or more surfaces. When the phosphatic composition is concentrated because of the evaporation of the one or more volatiles therefrom and during the evaporation, materials precipitate from the phosphatic composition, adhere to the one or more surfaces, and accumulate thereon. When the phosphatic composition is passed through one or more pipes, a scale can precipitate and/or deposit on the inner surface of the one or more pipes. In embodiments, the one or more volatiles comprises, consists of, or consists essentially of water. In this context, "mitigating" means changing the phosphatic composition such that the scale formed during the evaporation of one or more volatiles from the phosphatic composition accumulates more slowly on the one or more surfaces; and/or the scale is softer, more tractable, and/or more easily removed from the one or more surfaces.

As used herein, "scale-accumulating surface" means a surface on which a scale accumulates when the surface is in contact with a phosphatic composition. Non-limiting examples of scale-accumulating surfaces include surfaces of heat exchangers that are part of an evaporator of a phosphoric acid plant, interior surfaces of pipes, interior surfaces of flash tanks, nozzle plates and the like that contact phosphatic compositions.

As used herein, "hydroxypolyethoxy (10) allyl ether" means a polymer or blend of polymers having the formula $CH_2$=CH—$CH_2$—$(OCH_2CH_2)_n$—OH, where n has a value or an average value of between 9 and 11, in embodiments about 10.

As used herein, "rodding" is a process of striking scale with a solid object such as a rod or brush to remove the scale from a surface and/or to push scale along and out of a pipe or bore, such as a feedline or heat-exchanger tubes.

As used herein, "hydroblasting" is a process of striking scale with high-pressure water to remove scale from a surface and/or push scale along and out of a pipe or bore, such as a feedline or heat exchanger-tubes.

As used herein, "phosphoric acid handling plant" means any industrial facility that produces, uses, and/or handles phosphoric acid. In non-limiting embodiments, such phosphoric acid handling plants include phosphoric acid manufacturing plants, phosphate fertilizer manufacturing plants that handle phosphoric acid, and the like.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology*, 5th Edition, (2005), (Published by Wiley, John & Sons, Inc.) this definition shall control how the term is to be defined in the claims. All illustrated chemical structures also include all possible stereoisomer alternatives.

Discussion

In the manufacture of phosphoric acid, sulfuric acid is combined with one or more phosphate ores. A phosphate reaction mixture is made by combining sulfuric acid with the one or more phosphate ores, the one or more phosphate ores comprising $PO_4^{3-}$ ions and cations such as calcium ions $Ca^{2+}$. Reactions between components of the one or more phosphate ores and the sulfuric acid produces phosphoric acid as well as sparingly soluble or insoluble materials, such as calcium sulfate. As phosphate ores used in the manufacture of phosphoric acids typically comprise $Ca^{2+}$ and $PO_4^{3-}$, the reaction of phosphate and calcium ions in such a phosphate ore with sulfuric acid can be written as the simplified equation:

$$3Ca^{2+} + 2(PO_4)^{3-} + 3H_2SO_4 \rightarrow 2H_3PO_4 + 3CaSO_4$$

Other reactions can occur between other constituents of the ore and sulfuric acid, depending on what constituents are present in the ore. These other reactions can produce sparingly soluble and/or insoluble products. In a plant environment, some of the phosphoric acid produced by reaction of phosphate and sulfuric acid may be recirculated to a phosphate reaction mixture to avoid passivation of the phosphate ore with a layer of intractable calcium sulfate by helping solubilize the calcium phosphate as calcium dihydrogenphosphate (1), before reaction of the dihydrogenphosphate with the sulfuric acid (2):

$$Ca_3(PO_4)_2 + 4H_3PO_4 \rightarrow 3Ca(H_2PO_4)_2 \quad (1)$$

$$Ca(H_2PO_4)_2 + 3H_2SO_4 \rightarrow 6H_3PO_4 + 3CaSO_4 \quad (2)$$

The product of the reaction is a crude phosphoric acid containing calcium sulfate, as well as other compounds that can contribute to scale-formation. In a further step after the reaction, the crude phosphoric acid is filtered to remove solid calcium sulfate and to provide a first phosphatic composition.

Typically, such first phosphatic compositions are concentrated by heating in an evaporator under reduced pressure, the evaporator comprising a heat exchanger and a flash chamber. However, on subsequent concentration of the first phosphatic composition (or a crude phosphoric acid) in an evaporator, calcium sulfate, along with any other sparingly soluble materials in the crude phosphoric acid and/or finely suspended insoluble solids, precipitates and/or accumulates as a scale on one or more surfaces of the evaporator such as heat exchanger surfaces and/or interior surfaces of the flash chamber. Other processes involving evaporation of volatiles from the first phosphatic composition can also produce scale. For example, when the first phosphatic composition is sprayed from a nozzle, evaporation of one or more volatiles such as water from the aerosol can cause scale to accumulate on one or more surfaces of the nozzle.

Many phosphate ores such as fluorapatite and francolite comprise fluoride in addition to phosphate and calcium ions. The fluoride reacts with sulfuric acid to generate hydrogen fluoride, and in the presence of silica and/or silicates to generate hexafluorosilicate. The exact stoichiometric composition of the ores varies, but a basic equation for the reaction between fluoride and sulfuric acid in the presence of silica and/or silicates can be written:

$$6F^- + SiO_2 + 3H_2SO_4 \rightarrow SiF_6^{2-} + 3SO_4^{2-} + 2H_2O + 2H^+$$

Thus when the ores comprise fluoride in addition to phosphate, evaporative concentration of the phosphoric acid product therefrom produces very hard scales comprising intractable mixtures of calcium sulfate with hexafluorosilicates, fluoroaluminates, fluorides, and the like. In practice, many such scales are multimineralic—that is they comprise a variety of insoluble or sparingly soluble precipitated mineral materials comprising anions such as sulfate, carbonate, fluoride, silicates, hexafluorosilicate, pentafluoroaluminate, phosphate, oxide, and carbonate; cations such as calcium, potassium, aluminum, magnesium, sodium, and iron; and extended polymeric materials such as silicon dioxide.

Applicants have discovered scale-mitigating compositions that when added to phosphatic mixtures, surprisingly ameliorate the hardness of scale that forms and accumulates on surfaces that are in contact with the phosphatic mixtures, particularly scales that deposit on the surfaces during the concentration of phosphatic mixtures comprising phosphoric acid. Further, the scale-mitigating compositions slow the accumulation of the scales. This extends the acid production cycle in phosphoric acid production, because cleaning is required less frequently due to the slower scale-build up, and also because cleaning is more easily and quickly accomplished because of the softness of the scale. Scale inhibitors often target calcium sulfate that is the predominant phase in the evaporator. However, these scales are multimineralic and calcium sulfate phase is just one of several phases. Other major scale forming species need to be targeted, and those that are formed need to be dispersed to prevent them from agglomerating into large hard pieces.

The scale-mitigating compositions and/or aqueous scale-mitigating compositions are added to a first phosphatic composition to form a second phosphatic composition. During concentration of the first phosphatic compositions, for example by heating the composition under reduced pressure or spraying the first phosphatic composition through a nozzle, very hard scales deposit on surfaces in contact with the first phosphatic composition. However, during concentration of the second phosphatic compositions, soft scales deposit and accumulate on surfaces in contact with the second phosphatic composition. Highly advantageously, such soft scales are much more easily scratched, washed from the surfaces to which they adhere, and mechanically disintegrated, such as by washing them with a pressurized jet of water or other liquid. Because the scales are more easily removed, plant downtime is reduced, materials usage and power consumption during removal are reduced, as is risk of damage to the heat exchanger during the cleaning thereof. Furthermore, scale formation is retarded, that is scale forms more slowly than in the absence of the scale-mitigating compositions. For example, scale formation in the evaporator of a phosphoric acid plant is slowed, and time between required cleanings of the evaporator is extended. More phosphoric acid is produced per production cycle and productivity of the plant is thereby increased.

Scale-Mitigating Compositions

In embodiments, there is provided an aqueous scale-mitigating composition comprising, consisting of, or consisting essentially of: water; polyamino polyether methylene tetraphosphonate; a copolymer of acrylic acid and 2-acrylamido-2-methylpropane sulfonic acid; and a further component selected from the group consisting of (i) poly(methacrylic acid), (ii) a tetrapolymer of acrylic acid, 2-acrylamido-2-methylpropane sulfonic acid, (N-t-butyl)acrylamide, and itaconic acid, (iii) a copolymer of acrylic acid and hydroxypolyethoxy allyl ether, and (iv) any combination of (i)-(iii).

In embodiments, there is provided a scale-mitigating composition comprising, consisting of, or consisting essentially of: a polyamino polyether methylene tetraphosphonate; and any one or more components selected from the group consisting of (a) a combination of poly(methacrylic acid) and a copolymer of acrylic acid and 2-acrylamido-2-methylpropane sulfonic acid, (b) a tetrapolymer of acrylic acid, 2-acrylamido-2-methylpropane sulfonic acid, (N-t-butyl)acrylamide, and itaconic acid, (c) a copolymer of acrylic acid and 2-acrylamido-2-methylpropane sulfonic acid, and (d) a copolymer of acrylic acid and hydroxypolyethoxy allyl ether.

In embodiments, there is provided a scale-mitigating composition comprising, consisting of, or consisting essentially of any three or more polymeric components selected from the group consisting of a polyamino polyether methylene tetraphosphonate; poly(methacrylic acid), a tetrapolymer of acrylic acid, 2-acrylamido-2-methylpropane sulfonic acid, (N-t-butyl)acrylamide, and itaconic acid; a copolymer of acrylic acid and 2-acrylamido-2-methylpropane sulfonic acid; and a copolymer of acrylic acid and hydroxypolyethoxy allyl ether. In some such embodiments, the any three or more polymeric components comprises a polyamino polyether methylene tetraphosphonate.

In embodiments, there is provided a scale-mitigating composition comprising, consisting of, or consisting essentially of four parts by weight of a polyamino polyether methylene tetraphosphonate to one part by weight of a copolymer of acrylic acid and 2-acrylamido-2-methylpropane sulfonic acid; and a second polymeric component selected from the group consisting of (a) two parts by weight of poly(methacrylic acid) to three parts by weight of a copolymer of acrylic acid and 2-acrylamido-2-methylpropane sulfonic acid, (b) a tetrapolymer of acrylic acid, 2-acrylamido-2-methylpropane sulfonic acid, (N-t-butyl)acrylamide, and itaconic acid, (c) a copolymer of acrylic acid and 2-acrylamido-2-methylpropane sulfonic acid, (d) a copolymer of acrylic acid and hydroxypolyethoxy allyl ether, and (e) any combination of (a) to (d).

In embodiments, the tetrapolymer comprises about 80% to about 85% by weight of acrylic acid residue, about 5% by weight of 2-acrylamido-2-methylpropane sulfonic acid residue, about 3% to about 5% by weight of (N-t-butyl)acrylamide residue, and about 3% to about 5% by weight of itaconic acid residue.

In embodiments, the copolymer of acrylic acid and 2-acrylamido-2-methylpropane sulfonic acid comprises, consists of, or consists essentially of 60% by weight of acrylic acid residue and 40% by weight 2-acrylamido-2-methylpropane sulfonic acid residue.

In embodiments, the copolymer of acrylic acid and hydroxypolyethoxy allyl ether comprises about 50% by weight of acrylic acid residue and about 50% by weight of hydroxypolyethoxy allyl ether. In some such embodiments, the hydroxypolyethoxy allyl ether is hydroxypolyethoxy (10) allyl ether.

In embodiments, there is provided an aqueous scale-mitigating composition comprising, consisting of, or consisting essentially of any one of the scale-mitigating compositions herein and further comprising water. In embodiments, the aqueous scale-mitigating composition can be made by combining any two or more aqueous solutions selected from the group consisting of (i) an aqueous solution of (a), polyamino polyether methylene tetraphosphonate; (ii) an aqueous solution of (b), a copolymer of acrylic acid and 2-acrylamido-2-methylpropane sulfonic acid; (iii) an aqueous solution of (c), poly(methacrylic acid); (iv) an aqueous solution of (d), a tetrapolymer of acrylic acid, 2-acrylamido-2-methylpropane sulfonic acid, (N-t-butyl)acrylamide, and itaconic acid; (v) an aqueous solution of (e) a copolymer of acrylic acid and hydroxypolyethoxy allyl ether; and (vi) an aqueous solution of any combination of (a)-(e).

In embodiments, the concentration of solids by weight of any of the aqueous scale-mitigating compositions is about 5% to about 70%, 5% to about 60%, in embodiments about 10% to about 50%, in embodiments about 15% to about 45%, or about 20% to about 40% or about 20% to about 35%, or about 25% to about 30%. In some such embodiments, the solvent comprises, consists of, or consists essentially of water.

In embodiments of the aqueous scale-mitigating composition that comprise polyamino polyether methylene tetraphosphonate, in embodiments the aqueous scale-mitigating composition comprises about 1% to about 50%, in embodiments about 2% to about 30%, in embodiments about 3% to about 20%, or about 4% to about 15%, or about 5% to about 15% by weight of polyamino polyether methylene tetraphosphonate.

In embodiments of the aqueous scale-mitigating composition that comprise a copolymer of acrylic acid and 2-acrylamido-2-methylpropane sulfonic acid, in embodiments the aqueous scale-mitigating composition comprises about 1% to about 50%, in embodiments about 2% to about 30%, in embodiments about 3% to about 20%, or about 4% to about 15%, or about 5% to about 15% by weight of the copolymer of acrylic acid and 2-acrylamido-2-methylpropane sulfonic acid.

In embodiments of the aqueous scale-mitigating composition that comprise poly(methacrylic acid), in embodiments the aqueous scale-mitigating composition comprises about 1% to about 50%, in embodiments about 1% to about 30%, in embodiments about 1% to about 20%, or about 1% to about 15%, or about 2% to about 10% by weight of the poly(methacrylic acid).

In embodiments of the aqueous scale-mitigating composition that comprise copolymer of acrylic acid and hydroxypolyethoxy allyl ether, the aqueous scale-mitigating composition comprises about 1% to about 50%, in embodiments about 1% to about 30%, in embodiments about 2% to about 20%, or about 2% to about 15%, or about 2% to about 10% by weight of the copolymer of acrylic acid and hydroxypolyethoxy allyl ether.

In embodiments of the aqueous scale-mitigating composition that comprise the tetrapolymer of acrylic acid, 2-acrylamido-2-methylpropane sulfonic acid, (N-t-butyl)acrylamide, and itaconic acid, in embodiments the aqueous scale-mitigating composition comprises about 1% to about 50%, in embodiments about 1% to about 30%, in embodiments about 2% to about 20%, or about 2% to about 15%, or about 2% to about 10% by weight of the tetrapolymer of acrylic acid, 2-acrylamido-2-methylpropane sulfonic acid, (N-t-butyl)acrylamide, and itaconic acid.

In embodiments, the aqueous scale-mitigating composition comprises, consists of, or consists essentially of about 5% to about 15% by weight of polyamino polyether methylene tetraphosphonate, about 5% to about 15% by weight of a copolymer of acrylic acid and 2-acrylamido-2-methylpropane sulfonic acid, about 1% to about 10% of poly(methacrylic acid), and about 1% to about 20% of a copolymer of acrylic acid and hydroxypolyethoxy (10) allyl ether.

The scale-mitigating compositions disclosed herein and methods using them are useful for mitigating scales, wherein the scales are multimineralic. The scale-mitigating compositions described herein are useful when added to phosphatic compositions such as compositions comprising phosphoric acid and calcium sulfate and/or other sparingly soluble components. Such phosphatic compositions tend to produce scales that comprise calcium sulfate and other insoluble or sparingly soluble components. In embodiments, the scale-mitigating compositions slow the deposition of scale and/or produce softened scales deposited from a phosphatic composition when added thereto. Such softened scales are more easily cleaned from surfaces to which they adhere, and are more easily washed off the surfaces.

Scale-mitigating compositions disclosed herein are also useful for addition to hydrogen fluoride scrubbers in production of phosphoric acid. Scales produced therein typically comprise silicon dioxide and other sparingly soluble or insoluble components. The scale-mitigating compositions disclosed herein also address such scales, because they are useful for mitigating multimineralic scales. Therefore the scale-mitigating compositions disclosed herein are useful for mitigating multimineralic scales that comprise calcium sulfate and/or multimineralic scales that comprise silicon dioxide.

First and Second Phosphatic Compositions

In embodiments, there is provided a second phosphatic composition, the second phosphatic composition comprising any one of the scale-mitigating compositions or aqueous scale-mitigating compositions disclosed above, and further comprising a first phosphatic composition, wherein the first phosphatic composition comprises, consists of, or consists essentially of phosphoric acid and calcium sulfate. In embodiments, the phosphoric acid and the calcium sulfate are a reaction product formed from a phosphate ore combined with sulfuric acid. In some such embodiments, the phosphate ore and the sulfuric acid are mixed to form a phosphate reaction mixture. In some such embodiments, the phosphate reaction mixture is partially reacted or in other such embodiments fully reacted. In embodiments, the first phosphatic composition is made by grinding the phosphate ore to form a ground phosphate ore, mixing the ground phosphate ore with sulfuric acid to form a phosphate reaction mixture, maintaining the phosphate reaction mixture between 65° C. and 120° C. for a period of time to form a crude phosphoric acid, and filtering the crude phosphoric acid to provide the first phosphatic composition. In embodiments, the period of time is one hour to one day, in embodiments two minutes to one hour, in embodiments five minutes to one hour, in embodiments ten minutes to one hour, in embodiments 15 minutes to one hour, in embodiments 15 minutes to five hours, or 30 minutes to one hour, or 30 minutes to five hours, or one day to one week. In embodiments, the method further comprises mixing the second phosphatic composition. In some embodiments, the method is a batch process. In other embodiments, the method is a continuous process, wherein some of the first phosphatic composition is returned to the phosphate reaction mixture and/or the crude phosphoric acid. In embodiments, the second phosphatic composition comprises phosphoric acid and calcium sulfate. In embodiments, the first phosphatic composition comprises: $H^+$; $PO_4^{3-}$, $HPO_4^{2-}$, and/or $H_2PO_4^-$; $Ca^{2+}$; and $SO_4^{2}$ and/or $HSO_4^-$. In embodiments, the first phosphatic composition comprises water.

In embodiments, the concentration of the phosphoric acid (as $H_3PO_4$) in the first phosphatic composition, in the second phosphatic composition, or in both the first and the second phosphatic compositions is about 5% to about 40%, in embodiments about 10% to about 40%, in embodiments about 20% to about 40%, or in embodiments about 20% to about 35% by weight.

In embodiments, the aqueous scale-mitigating composition has a concentration of 5% to about 70% solids by weight, in embodiments about 10% to about 60%, in embodiments about 10% to about 50%, in embodiments about 15% to about 40%, in embodiments about 20% to about 35%, or in embodiments about 20% to about 30% by weight of solids. In some such embodiments, the second phosphatic composition comprises about 5 parts to about 2,000 parts by weight of the aqueous scale-mitigating composition per one million parts by weight of the first phosphatic composition, in embodiments, about 10 parts to about 1500 parts by weight, in embodiments 50 parts to about 1,000 parts, in embodiments about 100 parts to about 500 parts, or in embodiments about 200 parts to about 300 parts by weight of the aqueous scale-mitigating composition per one million parts by weight of the first phosphatic composition.

In embodiments, the phosphate ore comprises, consists of, or consists essentially of an apatite. In some such embodiments, the apatite comprises, consists of, or consists essentially of a fluoroapatite, a hydroxylapatite, a chlorapatite, or any combination thereof.

In embodiments, the first phosphatic composition further comprises water.

In embodiments, the first phosphatic composition comprises a first sparingly soluble component. In embodiments, the first sparingly soluble component is dissolved in, suspended as an insoluble in, or both dissolved in and suspended in the first phosphatic composition.

In embodiments, the second phosphatic composition comprises a second sparingly soluble component. In embodiments, the second sparingly soluble component is dissolved in, suspended as an insoluble in, or both dissolved in and suspended in the second phosphatic composition.

In embodiments, the first sparingly soluble component, the second sparingly soluble component, or both the first and second sparingly soluble components comprises, consists of, or consists essentially of calcium sulfate. In embodiments, the first sparingly soluble component, the second sparingly soluble component, or both the first and second sparingly soluble components comprises, consists of, or consists essentially of $Ca^{2+}$ and $SO_4^{2-}$, and a further moiety selected from the group consisting of $PO_4^{3-}$, F, $CO_3^{2-}$, $HCO_3^-$, $SiO_2$, a silicate anion, $Mg^{2+}$, $Al^{3+}$, $K^+$, $Na^+$, $Cl^-$, $OH^-$, $O^{2-}$, $SiF_6^{2-}$, $AlF_5^{2-}$, $Fe^{2+}$, $Fe^{3+}$, $SO_3^{2-}$, or any combination thereof.

In embodiments, the calcium sulfate is or contains a product of a reaction between sulfuric acid and calcium ions in the phosphate ore. In embodiments, the calcium sulfate comprises, consists of, or consists essentially of anhydrite, bassanite, gypsum, or any combination thereof.

In embodiments, the first phosphatic composition comprises, consists of, or consists essentially of water; phosphoric acid; calcium sulfate; and a precipitant selected from the group consisting of malladrite, heklaite, jakobssonite, alpha quartz, and any combination thereof.

In embodiments, the first phosphatic composition, the second phosphatic composition, or both the first and second phosphatic compositions are saturated with the sparingly soluble component.

In embodiments, heating the first phosphatic composition, subjecting the first phosphatic composition to a reduced pressure, or heating and subjecting the first phosphatic composition to a reduced pressure deposits a first scale on a scale-accumulating surface contacting the first phosphatic composition. i.e. The first phosphatic composition is capable of depositing a first scale on a scale-accumulating surface in contact with the first phosphatic composition.

In embodiments, heating the second phosphatic composition, subjecting the second phosphatic composition to a reduced pressure, or heating and subjecting the second phosphatic composition to a reduced pressure deposits a second scale on a scale-accumulating surface contacting the second phosphatic composition. i.e. The second phosphatic composition is capable of depositing a second scale on a scale-accumulating surface in contact with the second phosphatic composition.

Typically, a first phosphatic composition deposits a first scale on a surface during heating or evaporation in an attack tank, an evaporator, a pipe, or another part of a phosphoric acid or fertilizer plant. The problem is acute in an evaporator, where the evaporator comprises a heat exchanger and the first scale accumulates on a scale-accumulating surface of the heat exchanger. The first scale is intractable and difficult to clean from the surface and cleaning necessitates abrasion of the first scale. Such abrasion and/or rigorous cleaning can cause breakage in the evaporator.

Applicants have found that the second phosphatic compositions disclosed herein deposit a second scale on a scale-accumulating surface during heating or evaporation such as in an attack tank, an evaporator, a scrubber, a pipe, while sprayed from the orifice of a nozzle, or another part of a phosphoric acid or fertilizer plant. However, unlike the first scale deposited by the first phosphatic compositions under equivalent conditions on the same scale-accumulating surface, the second scale is soft and tractable. The second scale is much more easily cleaned from a scale-accumulating surface such as a scale-accumulating surface of the heat exchanger. In embodiments, the second scale is removable by cleaning without abrasion and/or is removable by washing that disintegrates the second scale. This is very advantageous, because it necessitates less down-time for cleaning of the plant or section of the plant in which the scale has accumulated on the scale-accumulating surface. Furthermore, the second scale accumulates more slowly on surfaces in contact with the second phosphatic compositions than the first scale. Time between required cleaning of scale-accumulating surfaces is increased and therefore productivity of the plant is increased.

Methods of Making a Second Phosphatic Composition

In embodiments, there is provided a method of making a second phosphatic composition, the method comprising: adding to a first phosphatic composition any one of the scale-mitigating compositions or aqueous scale-mitigating compositions disclosed herein to form the second phosphatic composition, wherein the first phosphatic composition comprises phosphoric acid and calcium sulfate. In embodiments, the phosphoric acid and the calcium sulfate are reaction products of phosphate ions and sulfuric acid.

In embodiments, the method of making a second phosphatic composition further comprises: combining a phosphate ore and the sulfuric acid to form a phosphate reaction mixture; maintaining the phosphate reaction mixture between 65° C. and 120° C. for a period of time to form a crude phosphoric acid; and filtering the crude phosphoric acid to provide the first phosphatic composition. In embodiments, the period of time is one hour to one day, in embodiments two minutes to one hour, in embodiments five minutes to one hour, in embodiments ten minutes to one hour, in embodiments 15 minutes to one hour, in embodiments 15 minutes to five hours, or 30 minutes to one hour, or 30 minutes to five hours, or one day to one week. In embodiments, the method further comprises mixing the second phosphatic composition. In some embodiments, the method is a batch process. In other embodiments, the method is a continuous process, wherein some of the first phosphatic composition is returned to the phosphate reaction mixture and/or the crude phosphoric acid.

In alternative embodiments, there is provided a method of making a second phosphatic composition, the method comprising: combining a phosphate ore and sulfuric acid to form a phosphate reaction mixture; maintaining the phosphate reaction mixture between 65° C. and 120° C. for a period of time to form a crude phosphoric acid; filtering the crude phosphoric acid to provide a first phosphatic composition; and adding to the phosphate reaction mixture and/or the crude phosphoric acid any one of the scale-mitigating compositions or aqueous scale-mitigating compositions disclosed herein. In embodiments, the period of time is one hour to one day, in embodiments two minutes to one hour, in embodiments five minutes to one hour, in embodiments ten minutes to one hour, in embodiments 15 minutes to one hour, in embodiments 15 minutes to five hours, or 30 minutes to one hour, or 30 minutes to five hours, or one day to one week. In embodiments, the method further comprises mixing the second phosphatic composition.

In embodiments, the first phosphatic composition is capable of precipitating a first scale on a scale-accumulating surface. In this context, "capable of precipitating a first scale" on a scale-accumulating surface means that when the first phosphatic composition contacts the scale-accumulating surface, low-solubility and/or insoluble materials in the first phosphatic composition adhere and accumulate on the scale-accumulating surface as a first scale.

In embodiments, the first phosphatic composition is capable of depositing a first scale on a scale-accumulating surface. In this context, "capable of depositing a first scale" means that during any process in which water and/or other volatiles evaporates from the first phosphatic composition and wherein the first phosphatic composition contacts the scale-accumulating surface, low-solubility and/or insoluble materials in the first phosphatic composition adhere and accumulate on the scale-accumulating surface as a first scale. First scales are hard, strong, and tend to accumulate on and adhere tenaciously to surfaces on which they accumulate. For example, the first scale is difficult to scratch with a utility knife. Such surfaces include the surfaces of pipes, bores, and tubes and include metal and graphite surfaces. First scales are multimineralic and can comprise one or more of $MgSiF_6.6H_2O$, $MgAlF_5.1.5H_2O$, $Na_2SiF_6$ (malladrite), $KNaSiF_6$ (heklaite), $CaSO_4$ (anhydrite), $CaSO_4.2H_2O$ (gypsum), $CaSO_4.0.5H_2O$ (bassanite), $SiO_2$ (alpha quartz), and mixtures thereof. Normally, the first scale contains one or more forms of calcium sulfate. The composition of the first scale depends on at least the composition of phosphate ore digested to make the first phosphatic composition.

In embodiments, the second phosphatic composition is capable of precipitating a second scale on a scale-accumulating surface. In this context, capable of precipitating a scale on a scale-accumulating surface means that when the second phosphatic composition contacts the scale-accumulating surface, low-solubility and/or insoluble materials in the second phosphatic composition adhere and accumulate on the scale-accumulating surface as a second scale. We have found that the second scales are soft, weak, and adhere weakly to surfaces on which they accumulate. For example, the second scale is easy to scratch with a utility knife or is even soft and deformable to the touch. Second scales are also multimineralic, and will normally comprise one or more forms of calcium sulfate. When compared with first scales formed from the same ores in the same plant (but without the scale-mitigating compositions of the invention), we have found that the second scales have a different chemical composition from the first scales. In comparison with first scales, in embodiments second scales comprise a lower concentration of $MgSiF_6.6H_2O$, a lower concentration of $MgAlF_5.1.5H_2O$, a lower concentration of $Na_2SiF_6$ (malladrite), a lower concentration of $KNaSiF_6$ (heklaite), a higher concentration of $SiO_2$ (alpha quartz), a higher concentration of $Al_3KH_{14}(PO_4)5.4H_2O$, or any combination thereof.

In embodiments, the second phosphatic composition is capable of depositing a second scale on a scale-accumulating surface. In this context, "capable of depositing a second scale" means that during any process in which water and/or other volatiles evaporates from the second phosphatic composition and wherein the second phosphatic composition contacts the scale-accumulating surface, low-solubility and/or insoluble materials in the second phosphatic composition adhere and accumulate on the scale-accumulating surface as a second scale.

Examples of processes in which water and/or other volatiles evaporate from a phosphatic composition such as a first phosphatic composition and a second phosphatic composition typically include a process in which water evaporates from the phosphatic composition. In embodiments the process is selected from the group consisting of evaporation from an open containment, spraying the phosphatic composition through an aperture or hole defined by a surface, applying heat to the phosphatic composition, applying a reduced pressure to the phosphatic composition, or any combination thereof.

In embodiments, the first phosphatic composition further comprises water.

In embodiments, a sparingly soluble component is present as one or more solutes in the first phosphatic composition, second phosphatic composition, or both the first and second phosphatic compositions.

In embodiments, a sparingly soluble component is present as one or more undissolved solids in the first phosphatic composition, the second phosphatic composition, or both the first and second phosphatic compositions.

In embodiments, a sparingly soluble component is present as both one or more solutes and one or more undissolved solids in the first phosphatic composition, the second phosphatic composition, or both the first and second phosphatic compositions.

In embodiments, the sparingly soluble component comprises, consists of, or consists essentially of the calcium sulfate. In embodiments, the calcium sulfate is a product of a reaction between sulfuric acid and calcium ions in the phosphate ore.

Heating the first phosphatic composition, subjecting the first phosphatic composition to a reduced pressure, or heating and subjecting the first phosphatic composition to a reduced pressure deposits a first scale on a scale-accumulating surface contacting the first phosphatic composition. The first phosphatic composition is capable of depositing a first scale on a scale-accumulating surface in contact with the first phosphatic composition.

When pumped through a pipe, insoluble matter within the first phosphatic composition precipitates within and/or accumulates as a first scale on an interior surface of the pipe. The pipe has at least one interior surface and at least one exterior surface, wherein at least a portion of the interior surface is a scale-accumulating surface as described herein.

The pipe can be cleaned of the first scale by rodding and/or hydroblasting with water and/or boil out. The hydroblasting with water is carried out at a pressure of about 6,000 psi (about 41369 kPa) to about 30,000 psi (about 206843 kPa), or about 6,000 psi (about 41369 kPa) to about 20,000 psi (about 137895 kPa), or about 6,000 psi (about 41369 kPa) to about 15,000 psi (about 103421 kPa), or about 6,000 psi (about 41369 kPa) to about 10,000 psi (about 68948 kPa), or about 10,000 psi (about 68948 kPa) to about 20,000 psi (about 137895 kPa); wherein the hydroblasting removes between 100% and about 80%, or about 95% to about 85%, or between 100% and about 90% of the scale accumulated on an interior surface of the pipe.

Heating the second phosphatic composition, subjecting the second phosphatic composition to a reduced pressure, or heating and subjecting the second phosphatic composition to a reduced pressure deposits a second scale on a scale-accumulating surface contacting the second phosphatic composition. The second phosphatic composition is capable of depositing a second scale on a scale-accumulating surface in contact with the second phosphatic composition.

In embodiments, when pumped through a pipe, insoluble matter within the second phosphatic composition precipitates within and/or accumulates as a second scale on an interior surface of the pipe. The pipe has at least one interior surface and at least one exterior surface, wherein at least a portion of the interior surface is a scale-accumulating surface as described herein.

In embodiments, the pipe can be cleaned of the second scale by rodding and/or hydroblasting with water. In embodiments, the hydroblasting with water is carried out at a pressure of about 3,000 psi (about 20684 kPa) to about 5,750 psi (about 39645 kPa), in embodiments about 4,000 psi (about 27579 kPa) to about 5,500 psi (about 37921 kPa), or in embodiments about 4,000 psi (about 27579 kPa) to about 5,000 psi (about 34474 kPa), or in embodiments about 5000 psi (about 34474 kPa); wherein the hydroblasting removes between about 80% and 100%, in embodiments about 85% to about 95%, or in embodiments between about 90% and 100% by weight of the scale accumulated on an interior surface of the pipe.

In embodiments, the phosphate ore comprises, consists of, or consists essentially of an apatite. In embodiments, the apatite comprises, consists of, or consists essentially of a fluorapatite, a hydroxylapatite, a chlorapatite, or any combination thereof.

In embodiments, the addition of the scale-mitigating composition to the first phosphatic composition is effected batch-wise or into a flow of the first phosphatic composition. In embodiments, the scale-mitigating composition is added to an inflow, to an outflow, or to an inflow and to an outflow of a flash chamber of an evaporator of a phosphoric acid-manufacturing plant.

In embodiments, the aqueous scale-mitigating composition is added to the first phosphatic composition in a ratio of about 10 parts to about 1000 parts by weight of the aqueous scale-mitigating composition per million parts by weight of the first phosphatic composition, in embodiments about 50 parts to about 750 parts by weight of the aqueous scale-mitigating composition per million parts by weight of the first phosphatic composition, in embodiments 50 parts to about 500 parts, or about 100 parts to about 400 parts, or about 200 parts to about 300 parts by weight of the aqueous scale-mitigating composition per million parts by weight of the first phosphatic composition.

Methods of Concentrating Second Phosphatic Compositions

In embodiments, there is provided a method of concentrating a second phosphatic composition, the method comprising any one of the methods disclosed herein of making the second phosphatic composition, and further comprising: disposing the second phosphatic composition in an evaporator comprising a fluid containment, the fluid containment comprising a scale-accumulating surface; and heating the second phosphatic composition, wherein the second phosphatic composition contacts the scale-accumulating surface. In embodiments, the second phosphatic composition is heated to a temperature of about 50° C. to about 110° C., in embodiments, 60° C. to about 100° C., or about 65° C. to about 95° C., or about 70° C. to about 95° C., or about 85° to about 95° C., or about 90° C. In embodiments, the method further comprises applying a reduced pressure to the fluid containment. In some such embodiments, the reduced pressure is from about 0.01 atmospheres to about 0.9 atmospheres, in embodiments from about 0.03 atmospheres to about 0.5 atmospheres, or in embodiments from about 0.045 atmospheres to about 0.35 atmospheres.

In embodiments, during the heating or the heating and application of the reduced pressure, water evaporates from the phosphatic composition (whether second phosphatic composition or first phosphatic composition, i.e. irrespective of whether the phosphatic composition contains a scale-mitigating composition of the invention or not respectively), whereby the concentration of phosphoric acid ($H_3PO_4$) increases in the phosphatic composition.

In some phosphoric acid plants, concentration is increased in stages in a series of evaporators. For example, the concentration of the phosphoric acid is increased from about 25% to about 40% in a first evaporator and then from about 40% to about 54% in a second evaporator. However, the increase in concentration may be achieved in one evaporator or in more than two evaporators, and the concentration of the phosphoric acid may be increased to 97% phosphoric acid, called "superphosphoric acid".

In embodiments, the concentration of the phosphoric acid in the second phosphatic composition is increased from about 20% to about 98%, in embodiments from about 25% to about 97%, in embodiments about 25% to about 70%, 25% to about 60%, in embodiment about 25% to about 55%, in embodiments about 25% to about 52%, in embodiments about 25% to about 45%, in embodiments about 25% to about 40%, in embodiments about 25% to about 35%, in embodiments about 40% to about 60%, in embodiments about 40% to about 55%, in embodiments about 35% to about 55%, in embodiments about 45% to about 60%, or in embodiments about 45% to about 55%.

In embodiments, the evaporator is the evaporator of a phosphoric acid plant. In embodiments, the fluid containment comprises one or more of a heat exchanger, a flash chamber, an outflow pipe, and an inflow pipe. The fluid containment comprises the scale-accumulating surface.

In embodiments, the heat exchanger has one or more walls defining a fluid flow path through the heat-exchanger. In embodiments, the fluid flow path is adapted to contain and allow the flow of a liquid phosphatic composition through the fluid flow path and thereby through the evaporator. In embodiments, the one or more walls is in thermal contact with a source of heat. In embodiments, the source of heat is steam.

In embodiments, the flash chamber comprises at least one interior surface.

In embodiments, the flash chamber is in fluid communication with the outflow pipe, the inflow pipe, and the heat exchanger. In embodiments, the flash chamber, the outflow pipe, the heat exchanger, and the inflow pipe together define a circulation route. In embodiments, one or more means for circulating a phosphatic composition such as the first or the second phosphatic composition is disposed within the circulation route. In embodiments, the means for circulating the phosphoric acid comprises or consists of a pump.

In embodiments, the method after the disposing further comprises circulating the second phosphatic composition around the circulation route. In embodiments, the circulating is effected by pumping the second phosphatic composition around the circulation route from the interior of the flash chamber to the outflow pipe, through the outflow pipe to the heat exchanger, through the fluid flow path of the heat exchanger and in contact with the one or more walls, to the inflow pipe, and through the inflow pipe back into the flash chamber. In embodiments, the circulating is effected by heating the second phosphatic composition in the flash chamber, wherein the second phosphatic composition flows around the circulation route by convection.

In embodiments, after disposing the second phosphatic composition in the evaporator, the method comprises heating the second phosphatic composition in the containment to evaporate one or more volatiles from the second phosphatic composition and thereby to concentrate the second phosphatic composition. In embodiments, the heating is effected by contacting the heat exchanger with the second phosphatic composition. In some such embodiments, the contacting is effected by circulating the second phosphatic composition around the circulation route, wherein the second phosphatic composition contacts the one or walls of the heat exchanger, and the one or more walls are in thermal contact with a source of heat. In some such embodiments, the temperature of the second phosphatic composition in the circulation route is about 50° C. to about 110° C., in embodiments, 60° C. to about 100° C., or about 65° C. to about 95° C., or about 70° C. to about 95° C., or about 85° to about 95° C., or about 90° C. In some embodiments, the heating comprises or consists of heating the second phosphatic composition under reduced pressure. In some such embodiments, the reduced pressure is from about 0.01 atmospheres to about 0.9 atmospheres, in embodiments from about 0.03 atmospheres to about 0.5 atmospheres, or in embodiments from about 0.045 atmospheres to about 0.35 atmospheres.

In embodiments, during the heating, a second scale forms on a scale-accumulating surface selected from: (a) the at least one interior surface; (b) the one or more walls; (c) an interior surface of the outflow pipe, (d) an interior surface of the inflow pipe, or (e) any combination of (a)-(d). The second scale can form on any part of the evaporator in contact with the second phosphatic composition. In some such embodiments, the second scale comprises potassium aluminum hydrogen phosphate. In embodiments, the second scale is substantially free of magnesium pentafluoroaluminate.

In some such embodiments the method further comprises after contacting the heat exchanger with the second phosphatic composition: draining the second phosphatic composition from the containment, and removing the scale from the scale-accumulating surface. In embodiments, the removing the scale comprises or consists of washing the scale from the scale-accumulating surface. In some such embodiments, the washing is with water. In some such embodiments, the washing consists of spraying the scale with a hose, wherein the scale disintegrates under the pressure of the hose and is washed from the scale-accumulating surface without any additional mechanical abrasion of the scale.

Applicants have found that unexpectedly and advantageously the second scales are much softer than the first scales. That is to say, a scale that accumulates during the heating under reduced pressure of any of the second phosphatic compositions is soft, in sharp distinction to the very hard and intractable scale that develops under the same conditions of temperature and pressure by subjecting the same composition absent the scale-mitigating compositions of the invention. Furthermore, the Applicants have found that unexpectedly and advantageously, the second scale is much softer when the scale-mitigating compositions comprise at least three of I-V, wherein I consists of or consists essentially of polyamino polyether methylene tetraphosphonate; II consists of or consists essentially of a combination of poly(methacrylic acid) and a copolymer of acrylic acid and 2-acrylamido-2-methylpropane sulfonic acid; III consists of or consists essentially of a tetrapolymer of acrylic acid, 2-acrylamido-2-methylpropane sulfonic acid, (N-t-butyl)acrylamide, and itaconic acid; IV consists of or consists essentially of a copolymer of acrylic acid and 2-acrylamido-2-methylpropane sulfonic acid; and V consists of or consists essentially of a copolymer of acrylic acid and hydroxypolyethoxy allyl ether. One criterion by which the softness of the scale is judged is how easily the scale is scratched with a sharp instrument, such as a box cutter. Another is the ease by which the scale is removed from a surface to which it adheres, e.g. by scrubbing or by washing with a pressurized jet of liquid. Applicants have found that the chemical composition of the scale depends, inter alia, on the composition of the scale-mitigating composition.

Applicants have found that the scale-mitigating compositions of the invention affect the chemical composition of the scales that are produced during the evaporation of one or more volatiles from phosphatic compositions. For example, in embodiments scales that are produced during the evaporation of one or more volatiles from the second phosphatic compositions do not comprise or are substantially free of magnesium pentafluoroaluminate. In embodiments, the second phosphatic compositions of the invention when subject to heat and/or reduced pressure or when sprayed from a nozzle produce scales comprising potassium aluminum hydrogen phosphate.

In embodiments, the scale-accumulating surface of any of the embodiments disclosed herein is selected from the group consisting of a metal surface, a graphite surface, a natural rubber surface, a synthetic rubber surface, a tungsten carbide surface, and a silicon carbide surface.

In embodiments, the metal surface is selected from the group consisting of a nickel-chromium-molybdenum alloy surface, a stainless steel surface, an iron-nickel-chromium alloy surface, a chromium-nickel-molybdenum stainless steel surface, an aluminum surface, a copper alloy surface, and an austenic nickel chromium surface.

In embodiments, the scale-accumulating surface is a surface of an item comprising, consisting of, or consisting essentially of an alloy comprising cobalt, chromium, molybdenum, iron, silicon, manganese, carbon, nickel, or any combination thereof.

In this context, a graphite surface and the like means a surface of an item comprising, consisting of, or consisting essentially of graphite.

In embodiments, the second scale-accumulating surface can be cleaned of the second scale by rodding and/or hydroblasting with water and or boil out. In embodiments, the hydroblasting with water is carried out at a pressure of about 3,000 psi (about 20684 kPa) to about 5,750 psi (about 39645 kPa), in embodiments about 4,000 psi (about 27579 kPa) to about 5,500 psi (about 37921 kPa), or in embodiments about 4,000 psi (about 27579 kPa) to about 5,000 psi (about 34474 kPa), or in embodiments about 5000 psi (about 34474 kPa); wherein the hydroblasting removes between 100% and about 80%, in embodiments about 95% to about 85%, or in embodiments between 100% and about 90% of the scale accumulated on an interior surface of the pipe. In embodiments, the second scale is removed from scale-accumulating surfaces by hydroblasting said surfaces at pressures lower than those required to remove the first scale from the same scale accumulating surface. The lower pressures reflect that the second scale is more easily removed from the surface than the first scale, thus reducing downtime and increasing production time. Further, using lower pressures for cleaning can reduce wear and tear on equipment thus cleaned and even reduce breakage of fragile parts such as impregnated graphite tubes, which the heat exchanger may comprise.

Methods of Spraying a Second Phosphatic Composition

In embodiments, there is provided a method of spraying a second phosphatic composition, the method comprising any one of the methods disclosed herein of making the second phosphatic composition or any one of the methods disclosed herein of concentrating the second phosphatic composition, and further comprising: contacting a scale-accumulating surface of a nozzle with the second phosphatic composition, wherein the nozzle comprises the scale-accumulating surface, and the scale-accumulating surface defines an orifice. In embodiments, a second scale deposits on the scale-accumulating surface. In embodiments, the method further comprises spraying the second phosphatic composition from the nozzle and/or through the orifice into a chamber. In embodiments, the chamber contains liquid ammonia. In embodiments, the second scale is free of or substantially free of magnesium pentafluoroaluminate. In embodiments, the second scale comprises potassium aluminum hydrogen phosphate.

Evaporator Assemblages

In embodiments, there is provided an evaporator assemblage, the evaporator assemblage comprising an evaporator, the evaporator comprising a flash chamber and one or more of an outflow pipe, an inflow pipe, and a heat exchanger. The flash chamber and the one or more of the outflow pipe, the inflow pipe, and the heat exchanger are in fluid communication with each other and together define a fluid containment. Stated differently, any of the one or more of the outflow pipe, the inflow pipe, and the heat exchanger, when present, are in fluid communication with the flash chamber and with each other. The evaporator assemblage further comprises any second phosphatic composition described herein, the second phosphatic composition being disposed in the fluid containment and contacting a scale-accumulating surface. "In the fluid containment" means within the flash chamber, within the heat exchanger (if present), within the outflow pipe (if present), within the inflow pipe (if present), or within any combination thereof. In embodiments, the fluid containment comprises the scale-accumulating surface.

The heat exchanger may be a shell-and-tube heat exchanger, a graphite block heat exchanger, or an open-air heating pit type heat exchanger.

In embodiments, the evaporator assemblage further comprises a second scale adhering to the scale-accumulating surface. In embodiments, the second scale is free of or substantially free of magnesium pentafluoroaluminate. In embodiments, the second scale comprises potassium aluminum hydrogen phosphate.

The foregoing may be better understood by reference to the following examples, which are presented for purposes of illustration and are not intended to limit the scope of the invention. In particular the examples demonstrate representative examples of principles innate to the invention and these principles are not strictly limited to the specific condition recited in these examples. As a result it should be understood that the invention encompasses various changes and modifications to the examples described herein and such changes and modifications can be made without departing from the spirit and scope of the invention and without diminishing its intended advantages. It is therefore intended that such changes and modifications be covered by the appended claims.

Methods of Removing Precipitated Second Scales and/or Deposited Second Scales

In embodiments, any of the scale-accumulating surfaces discloses herein is cleaned of the second scale by rodding, hydroblasting, boil out, or any combination thereof. In embodiments, the hydroblasting is carried out at a pressure of about 3,000 psi (about 20684 kPa) to about 5,750 psi (about 39645 kPa), in embodiments about 4,000 psi (about 27579 kPa) to about 5,500 psi (about 37921 kPa), or in embodiments about 5,000 psi (about 34474 kPa). In some such embodiments, the rodding and/or hydroblasting removes between about 80% and 100%, in embodiments about 85% to about 95%, or in embodiments between 90% and 100% by weight of the scale on the scale-accumulating surface. In some such embodiments, the hydroblasting removes between about 80% and 100%, in embodiments about 85% to about 95%, or in embodiments between 90% and 100% by weight of the scale on the scale-accumulating surface.

In embodiments, the hydroblasting is carried out on one or more tubes of a shell and tube heat exchanger, one or more pipes, one or more nozzles, one or more bore holes of a graphite block heat exchanger, one or more pipes of an open-air pit heat exchanger, or any combination thereof.

The relatively low pressures required for hydroblasting to remove the second scale reflect that the second scales disclosed herein adhere to any of the scale-accumulating surfaces disclosed herein less tenaciously than the first scales disclosed herein, the second scales are softer than the first scales, the second scales are weaker than the first scales, and/or any combination thereof.

In embodiments, the fluid medium for hydroblasting comprises, consists of, or consists essentially of water, steam, sulfuric acid, hydrochloric acid, phosphoric acid, or any combination thereof. In embodiments, the fluid medium for hydroblasting comprises, consists of, or consists essentially of reclaimed or recycled water. In embodiments, the fluid medium comprises, consists of, or consists essentially of tap water, pond water, or a combination thereof.

Use of Scale-Mitigating Compositions

In embodiments, any of the scale-mitigating compositions disclosed herein are used to reduce the rate of scale deposition on any of the scale-accumulating surfaces disclosed herein:

(i) to reduce rate of scale-deposition on the scale-accumulating surface; (ii) to reduce time to remove the scale from the scale-accumulating surface by (a) hydroblasting, (b) rodding, (c) boil out; or any combination thereof. In some such embodiments, the hydroblasting is conducted at a pressure of about 20684 kPa to about 39645 kPa, wherein from about 80% to 100% of the scale is removed from the scale-accumulating surface.

EXAMPLES

Example 1

Pretrial A

Following a cycle, the scale was removed from the heat exchanger of an evaporator of a phosphoric acid plant. The scale was washed and dried. The scale was hard and difficult to remove from the heat exchanger.

Pretrial B

Following a cycle, the scale was removed from the heat exchanger of the same evaporator as that of Pretrial A. The scale was washed and dried, and is shown in FIG. 1. The scale was hard and difficult to remove from the heat exchanger. Scoring the scale with a box cutter produced shallow scratch marks, as shown in FIG. 1.

Scale samples from Pretrial A and Pretrial B were analyzed by x-ray fluorescence for oxide composition and by x-ray diffraction for mineral/composition: The results are given in TABLE 3 and TABLE 4 respectively.

Example 2

The evaporator of the same phosphoric acid plant as in Example 1 was shut down and cleaned. The evaporator was restarted and the composition of TABLE 1 was added to the phosphoric acid in the evaporator at a rate of 150 parts by weight of the composition per million parts by weight of the crude phosphoric acid entering the evaporator. After a cycle of 30 days, the evaporator was shut down for cleaning, the scale removed from the heat exchanger, and the scale was analyzed by x-ray fluorescence for elemental/oxide composition and by x-ray diffraction for mineral/composition: The results are given in TABLE 3 and TABLE 4 respectively.

Figure 2:
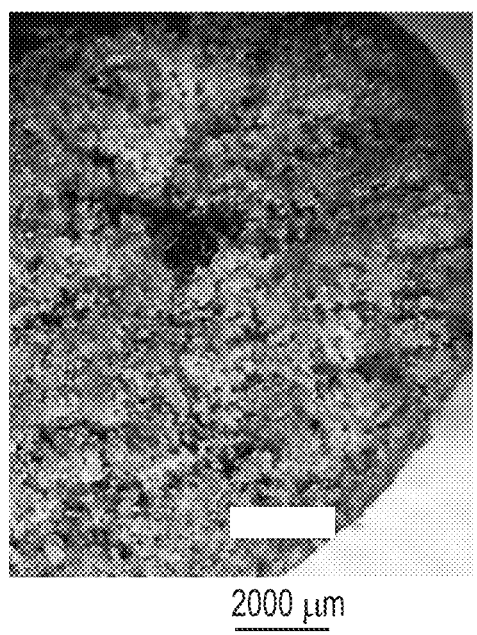
FIG. 2 shows a picture of air-dried scale from heat exchanger according to Example 2.

The scale is shown in FIG. 2. The scale was not as hard as that in Example 1, but still difficult to remove without assiduous effort.

TABLE 1

Composition of scale inhibitor added to phosphoric acid in Example 2

| Component | Parts by weight |
| --- | --- |
| Polyamino polyether methylene tetraphosphonate | 20 |
| Acrylic acid-2 acrylamido-2-methylpropane sulfonic acid copolymer (60-40 by weight) | 5 |
| Water | 75 |

Example 3

The evaporator of the same phosphoric acid plant as in Examples 1 and 2 was shut down and cleaned. The evaporator was restarted and the composition of TABLE 2 was added to the phosphoric acid in the evaporator at a rate of 235 parts by weight of the composition per million parts by weight of the crude phosphoric acid entering the evaporator.

TABLE 2

Composition added to phosphoric acid in Example 3

| Component | Parts by weight |
| --- | --- |
| Polyamino polyether methylene tetraphosphonate | 12.8 |
| Acrylic acid-2 acrylamido-2-methylpropane sulfonic acid copolymer (60-40 by weight) | 7.0 |
| Poly(methacrylic acid) | 2.6 |
| Acrylic acid- hydroxypolyethoxy (10) allyl ether copolymer (50-50 by weight) | 6.1 |
| Water | 71.5 |

Figure 3:
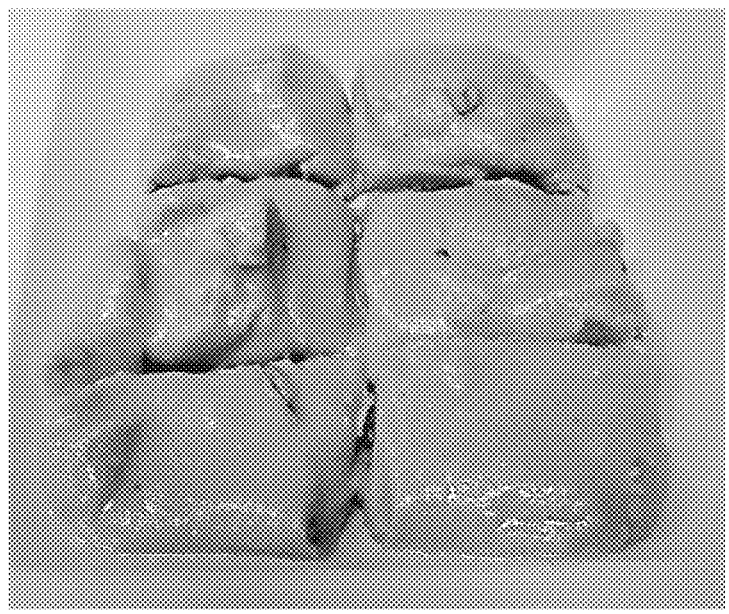
FIG. 3 shows a picture of scale from heat exchanger, without washing or drying, according to Example 3.
Figure 4:
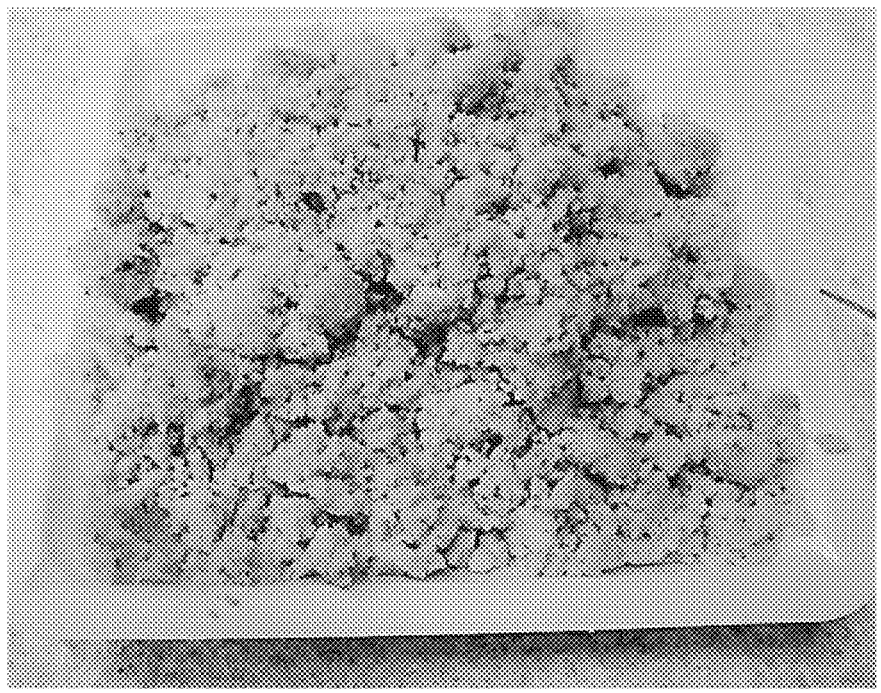
FIG. 4 shows a picture of washed and dried disintegrated scale from heat exchanger according to Example 3.

After a cycle of 29 days, the evaporator was shut down for cleaning, the scale removed from the heat exchanger, and the scale was analyzed by x-ray fluorescence for elemental/oxide composition and by x-ray diffraction for mineral/composition: The results are given in TABLE 3 and TABLE 4 respectively. The scale is shown if FIG. 3. The scale was very soft and easily removed from the evaporator. The scale barely maintained integrity, and fully disintegrated during washing. The scale after washing and drying is shown in FIG. 4.

TABLE 3

X-ray fluorescence results

| | | M | | |
| --- | --- | --- | --- | --- |
| | Example 1 | | | |
| Content | Pretrial A | Pretrial B | Example 2 | Example 3 |
| F | 37 | 41 | 18 | 26 |
| $P_2O_5$ | 19 | 16 | 18 | 30 |
| Mg | 12 | 5 | 1 | 1 |
| $SO_3$ | 10 | 10 | 25 | 8 |
| Al | 7 | 5 | 1 | 1 |
| CaO | 6 | 6 | 20 | 7 |
| Si | 2 | 4 | 5 | 6 |
| Na | 3 | 6 | 5 | 6 |
| K | 2 | 6 | 6 | 13 |
| $Fe_2O_3$ | — | — | — | 1 |

TABLE 4

X-ray diffraction results

Example 1

| Content | Pretrial A | Pretrial B | Example 2 | Example 3 |
|---|---|---|---|---|
| Magnesium hexafluorosilicate | M | — | t | — |
| Magnesium pentafluoroaluminate | M | M | t | — |
| Sodium hexafluorosilicate | M | m | t | m |
| Anhydrite $CaSO_4$ | m | m | M | — |
| Gypsum $CaSO_4 \cdot 2H_2O$ | M | m | m | — |
| Hemihydrate $CaSO_4 \cdot \frac{1}{2}H_2O$ | — | — | — | M |
| Silica (alpha-quartz) | — | — | M | — |
| Potassium sodium hexafluorosilicate | — | M | t | m |
| Potassium aluminum hydrogen phosphate | — | — | — | M |

M = major component,
m = minor component,
t = trace component,
— = none detected The results show that the scale from Example 3 was much softer than that of Example 2 and softer than those of the two pretrials of Example 1. The scale of Example 3 was much softer and more tractable than that of Example 2, even though the percentage of active ingredients was slightly higher in Example 2, showing the advantage of the multiple components of the scale-mitigating composition of Example 3.

Example 4

A plant trial consisting of two cycles was conducted in a phosphoric acid production plant, wherein each cycle included a period of production after cleaning of the evaporator, followed by a cleaning period. Therefore, after a cleaning procedure, the plant was run producing phosphoric acid, production was stopped to clean the heat exchanger, then a second cycle of running followed by cleaning was conducted. The plant trial of this example used no added scale-mitigating composition.

Phosphate ore was combined with sulfuric acid in a reactor to produce a crude phosphoric acid slurry, the slurry was filtered and clarified, and the resulting phosphoric acid was fed as a main flow through a feedline (pipe) approximately 1,500 feet (about 457 meters) in length to the flash tank of an evaporator. The main flow of the phosphoric acid from the clarifier was controlled via a computer-operated feed valve. Immediately before the feedline joined the flash tank, there was a manual shutoff valve which was routinely opened and closed (if possible) once per shift.

The evaporator comprised a flash tank in fluid communication with a shell-and-tube heat exchanger comprising approximately 900 tubes per bundle (wherein a bundle comprises a shell and tubes contained within). The phosphoric acid in the flash tank was circulated from the flash tank through a bottom outflow pipe and recirculation pump to the heat exchanger and through the tubes of the heat exchanger where it was heated. Phosphoric acid thus heated then flowed from the tubes of the heat exchanger through an inflow pipe back into the evaporator.

Scale accumulated within the feedline to the evaporator, reducing flow therein. As flow reduced, the computer-operated feed valve was opened to reestablish the previous flow, until the feed-valve was completely open and flow doesn't increase. Then the evaporator was taken off-line and feedline was closed and cleaned by sending condensate though the feedline for several hours to remove scale from the interior of the feedline. Following this procedure, on average once every seven to ten days plant operators discontinued supply of phosphoric acid to the evaporator and cleaned the interior of the feedline. Such feedline cleaning is typically done 2 to 3 times in each cycle, which is on an average 25-days long. During this feedline cleaning the heat-exchanger tubes are not cleaned and the acid in the evaporator is recirculated.

Scale also accumulated in the manual shutoff valve, and the scale accumulating over time necessitating increasing force with time to close or open the valve. When the valve could no longer be closed, the operators left the valve open until the feedline was cleaned.

Scale also accumulated inside the heat exchanger on the inside surface of the tubes thereof. At the end of a cycle, in order to maintain acid flow through the heat exchanger and maintain efficient heat transfer from the shell to the acid within the tubes, production was discontinued. Blocked and partially blocked tubes (about 300 tubes) were then cleaned by hydroblasting with water at about 6,000 pounds per square inch (psi) (about 48,263 kPa) to about 10,000 psi (68,948 kPa). This pressure was needed to remove scale from the interior of the plugged tubes. The resultant production times and non-production times associated with cleaning over the two cycles are set forth in TABLE 5:

TABLE 5

Total production times and cleaning times for the two cycles in Example 4

| | | |
|---|---|---|
| Total time two cycles | | 53.3 days |
| Production time | | 44.92 days |
| Non-production time | | 8.38 days |
| Feedline cleaning | Number of cleanings | 6 |
| | Stoppage time per cleaning | 0.56 days |
| | Total cleaning time | 3.5 days |
| Evaporator cleaning | Total cleaning time | 3.2 days |
| Total cleaning time | | 6.70 days |
| Production time/cleaning time | | 6.7 |
| $P_2O_5$ production | | 16,676 tons |
| Estimated $P_2O_5$ production per 330-day year | | 103,264 tons |

Figure 5:
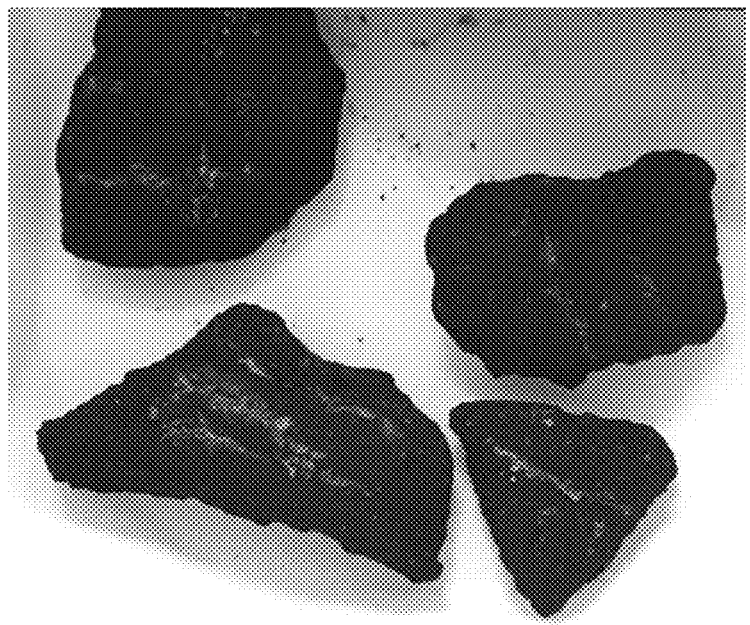
FIG. 5 shows a picture of scale rodded from heat-exchanger tubes according to Example 4.

Scale rodded from the tubes of the heat-exchanger is shown in FIG. 5. The scale was relatively hard and was difficult to score with a utility knife.

Example 5

Following the plant trial described in Example 4, a trial of a single cycle of 42.17 days was conducted using an aqueous scale-mitigating composition having the formulation given in TABLE 6.

TABLE 6

Composition added to phosphoric acid in Example 5

| Component | Parts by weight |
|---|---|
| Polyamino polyether methylene tetraphosphonate | 10.7 |

TABLE 6-continued

Composition added to phosphoric acid in Example 5

| Component | Parts by weight |
|---|---|
| Acrylic acid-2 acrylamido-2-methylpropane sulfonic acid copolymer (60-40 by weight) | 7.4 |
| Poly(methacrylic acid) | 3.2 |
| Acrylic acid- hydroxypolyethoxy (10) allyl ether copolymer (50-50 by weight) | 5.6 |
| Water | 73.1 |

The aqueous scale-mitigating composition was added at two locations. First dosing point was right out of the tank holding the clarified acid. The second dosing point was about ten meters prior to entry point of the clarified acid to the top of the heat exchanger.

Otherwise, the cycle was conducted in substantially the same manner as in Example 4. Production times and cleaning times are given in TABLE 7:

TABLE 7

Production times and cleaning times in Example 5

| | | |
|---|---|---|
| Total cycle time | | 42.17 days |
| Production time | | 39.67 days |
| Non-production time | | 2.5 days |
| Feedline cleaning | Number of cleanings | 2 |
| | Stoppage time per cleaning | 0.33 days |
| | Total cleaning time | 0.67 days |
| Evaporator cleaning | Total cleaning time | 1.4 days |
| Total cleaning time | | 2.07 days |
| Production time/cleaning time | | 19.2 |
| $P_2O_5$ production | | 15,058 tons |
| Estimated $P_2O_5$ production per 330-day year | | 117,846 tons |

Without the addition of the scale-mitigating composition shown in TABLE 6, the ratio of production time to cleaning time was 6.7, whereas with the addition of the formulation shown in TABLE 6 to the acid in the reactor, the ratio was increased to 19.2. With the addition of the scale-mitigating composition, less stoppages were required per cycle time. This reflects the slower build-up of scale in the heat-exchanger and the feedline.

Furthermore, less time was required per stoppage to clean the feedline (0.33 days compared with 0.59 days to clean with hydroblasting). This reflects that the actual scale produced was softer and easier to remove than the scale produced absent the scale-mitigating composition.

The overall effect of the improvements included increased acid production per unit time due to less down time for scale-cleaning, prolonging the cycle, and producing more acid per production day by maintaining a comparatively high heat exchange coefficient throughout the cycle.

Example 6

Following the cycle run in Example 5, the addition of the scale-mitigating composition to the phosphoric acid was discontinued. However, after the cycle with the aqueous scale-mitigation composition described in Example 5, the average cleaning time per heat-exchanger tubes was reduced by about 50%. About 74% of the tubes could be hydroblasted within less than 40 seconds, and tubes that were difficult to clean were hydroblasted within two minutes, whereas before the trial described in Example 5, tubes that were difficult to rod took about five minutes to clean by hydroblasting.

Furthermore, hydroblasting only required about 5,000 psi (34,473.79 kPa) to remove scale from the heat-exchanger tubes.

Example 4 was run without a scale-mitigating composition. Example 5 was run following Example 4. In Example 5, the scale-mitigating composition (formulation given in TABLE 6) was added. The run of the present Example 6 followed that of Example 5, and was conducted without scale-mitigating composition.

Figure 6:
FIG. 6 shows scale rodded from heat-exchanger tubes according to Example 6.

The scale that accumulated in the heat-exchanger tubes in the present Example was softer than that obtained in Example 4. This indicates that the addition of the scale-mitigating composition described in Example 5 had beneficial effects that continued after its use was discontinued. i.e. the scale remained softer and easier to clean, although the use of the scale-mitigating composition had been discontinued. Exemplary scale rodded from the tubes is shown in FIG. 6. The scale could be easily scored with a utility knife.

Example 7

Two trials were run in a phosphoric acid plant. The evaporator comprised a flash tank in fluid communication with a block heat exchanger. The block heat exchanger, about 20-30 feet high, comprised about eight to about ten graphite blocks. Each graphite block defined two sets of bore holes—one set of bores holes through which the acid was passed and a second set through which steam was passed. The first set of bore holes was orthogonal to the second set of bore holes. The first set of bore holes and the second set of bore holes were not in fluid communication with each other.

The phosphoric acid in the flash tank of the evaporator was circulated from the flash tank through a bottom outflow pipe through a recirculation pump to the heat exchanger and through bore holes in the graphite heat exchanger where it was heated. Phosphoric acid thus heated then flowed from the heat exchanger through an inflow pipe back into the evaporator and concentrated acid collection pipe was near the top of the acid level.

In the first trial, no scale-mitigating composition was added to the phosphoric acid. In the second trial, the same scale-mitigating composition used in Example 5 (formulation given in TABLE 6) was added to the phosphoric acid that was fed to the heat exchanger.

Production was stopped as necessary for heat exchanger cleaning, depending on steam flow, feed acid flow to the heat exchanger, and steam pressure in the heat exchanger.

In trial 1, the production phase lasted about 126 hours before production needed to be stopped for heat-exchanger cleaning. In trial 2, the production phase lasted about 166 hours before production needed to be stopped for heat-exchanger cleaning. Use of the scale-mitigating composition allowed for an increase in production time of about 40 hours. In addition, trial 2 produced on an average 49 tons more concentrated acid or 24 tons of $P_2O_5$ per day.

What is claimed is:

1. A method comprising:
    adding to a first phosphatic composition an aqueous scale-mitigating composition comprising
    5% to 15% by weight of a polyamino polyether methylene tetraphosphonate,
    5% to 15% by weight of a copolymer of acrylic acid and 2-acrylamido-2-methylpropane sulfonic acid, 1% to 10% by weight of poly(methacrylic acid),
5% to 15% by weight of a copolymer of acrylic acid and a hydroxypolyethoxy allyl ether, and
water,
to form a second phosphatic composition,
wherein the first phosphatic composition comprises phosphoric acid and calcium sulfate.

2. The method of claim 1, the method further comprising forming the first phosphatic composition by
combining a phosphate ore and sulfuric acid to form a phosphate reaction mixture;
maintaining the phosphate reaction mixture at 65° C. to 120° C. for 30 minutes to five hours to form a crude phosphoric acid; and
filtering the crude phosphoric acid to remove insoluble material and provide the first phosphatic composition.

3. The method of claim 2, wherein the phosphate ore comprises an apatite.

4. The method of claim 3, wherein the apatite is a fluorapatite, a hydroxylapatite, a chlorapatite, or any combination thereof.

5. The method of claim 1, wherein the aqueous scale-mitigating composition has a concentration of about 10% to about 50% solids by weight.

6. The method of claim 5, wherein the second phosphatic composition comprises about 5 parts by weight to about 2000 parts by weight of the aqueous scale-mitigating composition to one million parts by weight of the first phosphatic composition.

7. A scale-mitigating composition comprising:
5% to 15% by weight of a polyamino polyether methylene tetraphosphonate, 5% to 15% by weight of a copolymer of acrylic acid and 2-acrylamido-2-methylpropane sulfonic acid,
1% to 10% by weight of poly(methacrylic acid),
5% to 15% by weight of a copolymer of acrylic acid and hydroxypolyethoxy allyl ether, and
water.

8. The aqueous scale-mitigating composition of claim 7 wherein a percent solids by weight of the aqueous scale-mitigating composition is from 20% to 40%.

9. A second phosphatic composition comprising the aqueous scale-mitigating composition of claim 7, phosphoric acid, and calcium sulfate, wherein the phosphoric acid and the calcium sulfate are products of a reaction between a phosphate ore and sulfuric acid.

* * * * *